United States Patent [19]

Arai

[11] Patent Number: 4,840,553
[45] Date of Patent: Jun. 20, 1989

[54] METAL MOLD STRUCTURE FOR MOLDING MULTI-LAYER RESIN

[75] Inventor: Takashi Arai, Tokyo, Japan

[73] Assignee: Canon Kabushiki Kaisha, Tokyo, Japan

[21] Appl. No.: 246,613

[22] Filed: Sep. 20, 1988

Related U.S. Application Data

[63] Continuation-in-part of Ser. No. 24,711, Mar. 11, 1987, abandoned.

[30] Foreign Application Priority Data

Mar. 20, 1986 [JP] Japan ................................ 61-063453
Mar. 27, 1986 [JP] Japan ................................ 61-069424
Jun. 26, 1986 [JP] Japan ................................ 61-098586

[51] Int. Cl.$^4$ ....................... B29C 45/13; B29C 45/16
[52] U.S. Cl. .................................. 425/129.1; 264/255;
264/328.8; 425/130; 425/573
[58] Field of Search ................. 425/129.1, 132, 130,
425/257, 562, 564, 568, 572, 573, 585, 586, 587,
588, 808; 264/2.7, 250, 255, 328.8, 328.12,
328.13, DIG. 57, DIG. 83; 249/117, 135;
354/286; 350/254, 255, 503–505; 428/36, 412

[56] References Cited

U.S. PATENT DOCUMENTS

| | | | |
|---|---|---|---|
| 2,043,584 | 6/1936 | Husted | 425/573 X |
| 2,226,408 | 12/1940 | Nast | 425/573 X |
| 2,799,435 | 7/1957 | Abplanap | 264/328.8 X |
| 3,523,991 | 8/1970 | Tucker | 264/328.8 X |
| 3,599,290 | 8/1971 | Garner | 264/DIG. 57 |
| 3,690,797 | 9/1972 | Garner | 425/573 X |
| 3,733,156 | 5/1973 | Garner | 425/132 |
| 3,801,684 | 4/1974 | Schrewe et al. | 264/40.7 |
| 3,809,519 | 5/1974 | Garner | 425/568 X |
| 3,873,656 | 3/1975 | Garner | 264/DIG. 83 |
| 3,976,226 | 8/1976 | Monnet | 425/130 X |
| 4,052,497 | 10/1977 | Monnet | 264/255 |
| 4,403,933 | 9/1983 | Davis et al. | 425/573 X |

FOREIGN PATENT DOCUMENTS

59-37646 3/1984 Japan ........................ 264/328.8
59-29416 7/1984 Japan .

*Primary Examiner*—Richard L. Chiesa
*Attorney, Agent, or Firm*—Fitzpatrick, Cella, Harper & Scinto

[57] ABSTRACT

In a metal mold for a multi-layer resin molded article for effecting, in injection-molding a cylindrically-shaped part, sandwich molding in which core layer resin is used for the center of the cylinder portion of the cylindrically-shaped part and skin layer resin is used for the portion around the center of the cylinder portion, a mold member provided with a cavity for molding the cylindrically-shaped part has attached thereto a runner plate provided with a plurality of runners for passing the resins therethrough into the cavity, the runner plate has attached thereto a fixed plate provided with a sprue connected to an injection cylinder unit for the core layer resin and an injection cylinder unit for the skin layer resin, the start point of the plurality of runners and the injection port of the injection cylinder unit for the core layer resin are arranged on a straight line, and a runner for the skin layer resin is provided between the injection cylinder unit for the skin layer resin and the start point of the runners.

2 Claims, 10 Drawing Sheets

METAL MOLD STRUCTURE FOR MOLDING MULTI-LAYER RESIN

This application is a continuation-in-part of U.S. Ser. No. 024,711, filed Mar. 11, 1987, now abandoned.

BACKGROUND OF THE INVENTION

1. Field of the Invention

This invention relates to a metal mold for so-called sandwich molding in which a core layer resin material is used for the central layer of a molded article and a skin layer resin material is used for the surface layer of the molded article and the core layer resin is molded into the form of a sandwich with the skin layer resin.

2. Related Background Art

The sandwich molding according to the present invention is characterized in physical strength and improved appearance and slidability of the outer surface, and is suitable for the resin molding of the barrel member of a lens barrel.

As the construction of a lens barrel, there is popularly known a construction which has a lens, a lens holding frame, a fixed cylinder, an intermediate cylinder, an operating ring, etc., and in which the operating ring is rotated about the optical axis to thereby move and control the lens holding frame in a direction parallel with the optical axis through the intermediate cylinder, there is known a helicoid cylinder in which helicoid portions are provided on the inner and outer peripheries of the intermediate cylinder to convert the rotational force of the operating ring about the optical axis into the movement of the lens holding frame in a direction parallel with the optical axis. In the case of a lens barrel, the adoption of a metal such as aluminum (Al) or brass (Bs) as the material thereof leads to physical advantages such as excellent strength and high dimensional accuracy, while on the other hand, it poses numerous problems such as heavy weight, high cost resulting from machining of the metal, and limited productivity, and injection molding which uses resin material in place of metal materials has heretofore been practiced. As a material suitable for the helicoid cylinder, there is known polycarbonate, ABS, polybutylene terephthalate (PBT), modified polyphenylene oxide or polyacetal, and further, use has been made of resin materials having glass fiber or carbon fiber mixed therewith to increase mechanical strength.

The polycarbonate material having glass fiber mixed therewith, as compared with the conventional materials, can provide a helicoid cylinder guaranteed in reduced cost, high accuracy and mechanical strength, but it leaves a problem that the glass fiber is exposed on the inner and outer peripheral surfaces of the helicoid cylinder, whereby an improvement is required in the slidability with which the helicoid cylinder is slidably fitted to the inner and outer cylinders thereof.

A solution of the above-noted problem can be achieved by making the cylinder member into a multi-layer structure. For example, by the use of the sandwich molding (hereinafter referred to as the SW molding) as described in Japanese Patent Publication No. 50-28464, U.S. Pat. No. 3,809,519, U.S. Pat. No. 3,599,290, U.S. Pat. No. 3,733,156, U.S. Pat. No. 3,801,684, U.S. Pat. No. 3,690,797 and U.S. Pat. No. 3,873,656, a resin material of excellent slidability having no glass fiber mixed therewith for forming the surface layer of a helicoid cylinder is first poured into the cavity of a metal mold for molding the helicoid cylinder, and then a resin material having glass fiber mixed therewith for forming the core of the helicoid cylinder is poured into the cavity, whereby the surface layer is formed of the smooth resin and the core is formed of the resin of great mechanical strength and thus, a helicoid cylinder which solves the aforementioned problem is provided.

In the sandwich molding, there are the following problems remaining to be solved.

(1) A first problem is the eccentricity of the injected amount of core layer resin material.

This problem will hereinafter be discussed in detail.

Figure 1A:
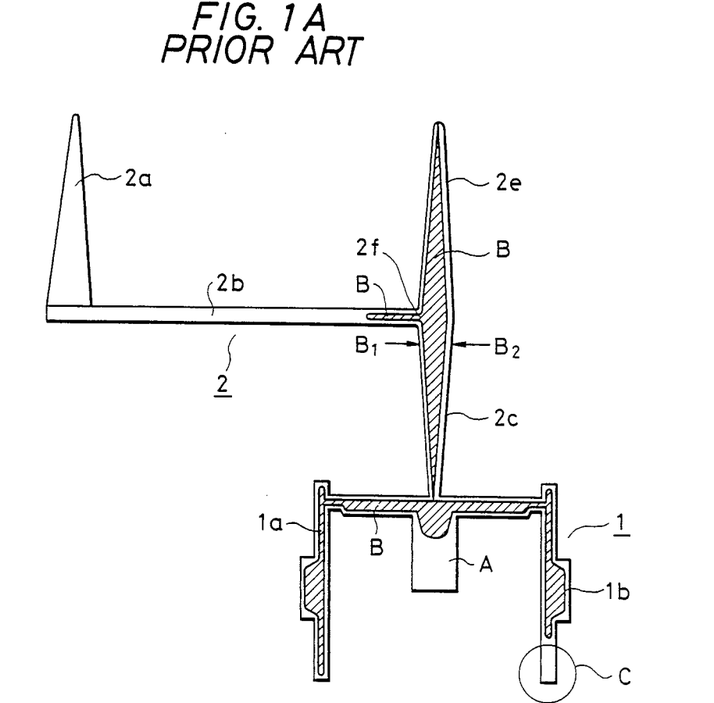
FIGS. 1A, 1B and 2A illustrate the aforementioned first problem peculiar to the prior-art sandwich molding machine, FIG. 1A showing a molded article 1 and each runner portion, FIG. 1B being a cross-sectional view taken along line B1–B2 of FIG. 1A, and FIG. 2A being an illustration of the essential portions of the molding machine.
Figure 1B:
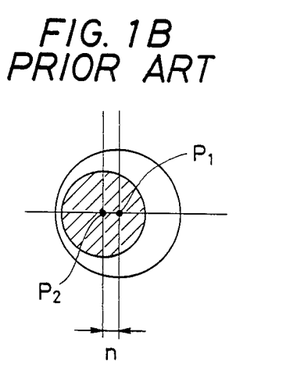

FIGS. 1A and 1B of the accompanying drawings are cross-sectional views showing the essential portions of a molded article 1 formed by the sandwich molding of the helicoid cylinder in the afore-described lens barrel and each runner 2. The central portion of the molded article indicated by hatching shows the core layer resin portion, and the outer side of the core layer resin portion (the outer surface portion of the molded article which is shown in white) is the skin layer resin portion.

In FIG. 1A, reference character 1a designates the cylinder portion of the helicoid cylinder 1, and reference character 1b denotes the helicoid portion of the helicoid cylinder.

The helicoid portion is fitted between the fixed cylinder and the lens holding cylinder in a lens barrel, is rotated about the optical axis by the operating force of an operating member to move the lens holding cylinder in the direction of the optical axis, thereby accomplishing the focusing operation or the zooming operation.

Figure 2A:
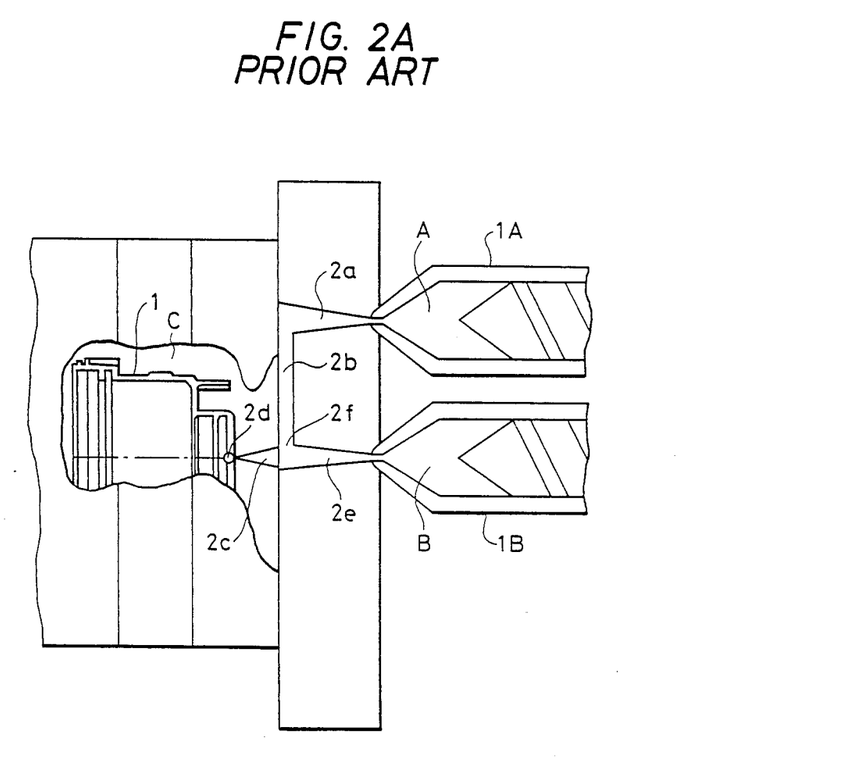

A molding machine shown in FIG. 2A of the accompanying drawings is used to sandwich-mold the above-described helicoid cylinder.

Skin layer resin is injected from a first injection cylinder 1A and core layer resin is injected from a second injection cylinder 1B, and the skin layer resin A is injected through a sprue 2a for the skin, a runner 2b for the skin and a common runner 2c and further through a gate 2d into the cavity C of a metal mold.

The core layer resin B is injected through a sprue 2e for core, the common runner 2c and the gate 2d into the cavity C.

A predetermined amount of skin layer resin is first injected into the cavity, and then the core layer resin is injected into the cavity, and when the core layer resin comes to the junction 2f of the runner 2b for the skin and the sprue 2e for core, part of the core layer resin B enters the runner 2b for the skin because the injection pressure of the core layer resin is higher than the injection pressure of the skin layer resin. By part of the core layer resin B entering the runner 2b for the skin, the center of the flow axis of the core layer resin B which flows through the runner 2c becomes eccentric (n) from the center $P_1$ of the runner 2c toward a point $P_2$ (toward the 2b side), as shown in FIG. 1B, and further, the resin B flows through the gate 2d and thus, the core layer resin in the portion of the cavity indicated at C in FIG. 1A becomes deficient.

As a result, part of the fore end of the helicoid cylinder 1 is not sandwich-molded, but there is created a portion which is weak in strength as compared with the other sandwich-molded portion.

(2) A second problem left to be solved in sandwich molding is a problem that the core layer resin material mixes with the skin layer resin material. This problem will hereinafter be discussed in detail.

Figure 3A:
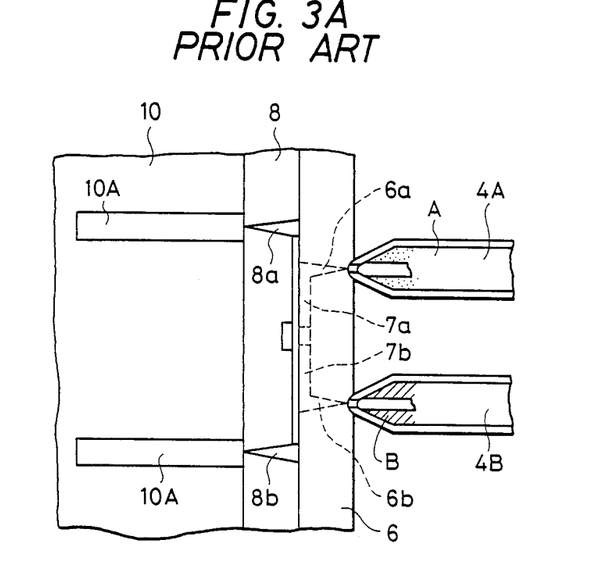
FIGS. 3A and 3B illustrate the aforementioned second problem, FIG. 3A being an illustration of a molding machine, and FIG. 3B being a cross-sectional view of a runner portion.
Figure 3B:
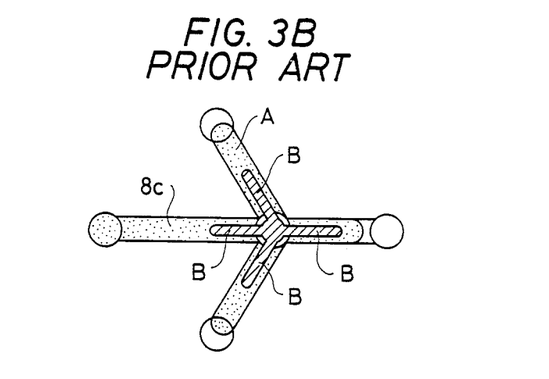

For example, when sandwich molding is to be effected by an injection molding machine shown in FIG. 3A of the accompanying drawings to mold a barrel member, the skin layer resin material from a first injection cylinder 4A is injected through the sprue 6a of a fixed plate 6 and through the runners 8a and 8b of a runner plate 8 into the cavity 10A of a metal mold 10. After a predetermined amount of skin layer resin material A has been injected, a core layer resin material B is injected from a second injection cylinder 4B through a sprue 6b and the runners 8a and 8b into the cavity 10A and the core layer resin material advances while pushing forward the previously injected skin layer resin material, whereby sandwich molding is accomplished, but as shown in FIG. 3B of the accompanying drawings, the later injected core layer resin material also enters a runner 8c through which the skin layer resin material passes.

As a result, where molding is to be effected subsequently to the first injection process, if injection is effected from the state of FIG. 3B, the core layer resin B will mix in the sprue 6a through which the skin layer resin A passes and therefore, if the metal mold is then heated and the skin layer resin material and the core layer resin material are successively injected, the skin layer resin and the core layer resin will mix with each other to make sandwich molding impossible.

(3) A third problem in sandwich molding is the non-uniformity of the core layer resin material which enters each runner of a metal mold.

Figure 4A:
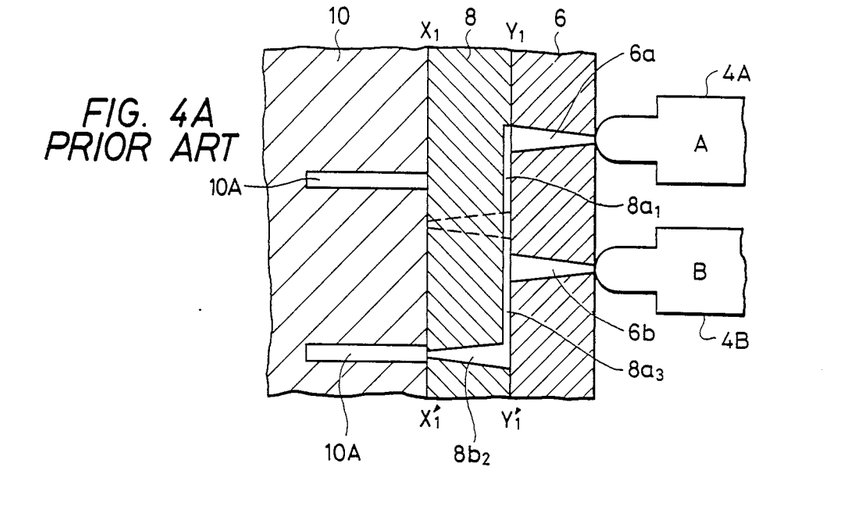
FIGS. 4A, 4B and 5 illustrate the aforementioned third problem, FIG. 4A being an illustration of a molding machine, FIG. 4B being an illustration of runners and a sprue, and FIG. 5 showing the amounts of resin in respective runners.
Figure 4B:
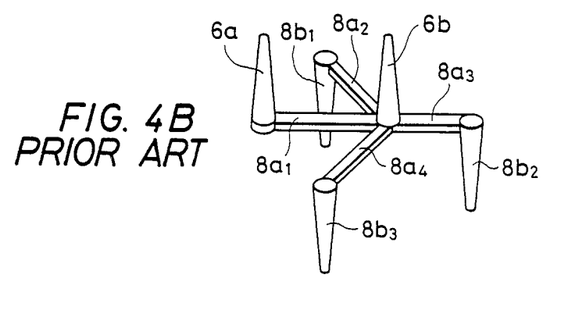

When the above-described barrel member is sandwich-molded by a molding machine shown in FIGS. 4A and 4B of the accompanying drawings, the filling state of resins forming the sandwich becomes an undesirable state.

That is, in the molding machine of FIG. 4A, injection cylinder units 4A and 4B for injecting skin layer resin A and core layer resin B, respectively, are connected to the sprues 6a and 6b of a fixed plate 6, and the resin which have passed through the sprues 6a and 6b are injected through the runners $8a_1, 8a_2, \ldots, 8b_1, 8b_2$ of a runner plate 8 into the cavity 10A of a metal mold 10.

Figure 5:
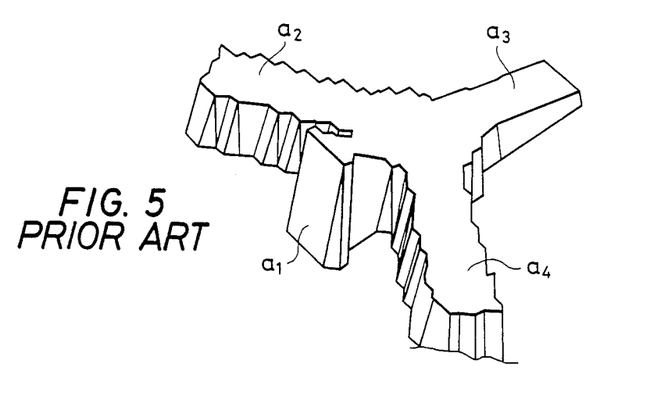

When the skin layer resin material A is earlier poured into the runners $8a_1, 8a_2, \ldots$ through the sprue 6a by the use of the molding machine of the described construction, the amounts $a_2, a_3$ and $a_4$ of skin layer resin material A flowing into the respective runners become different as shown in FIG. 5 of the accompanying drawings.

In FIG. 4A, the skin layer resin material poured in from a skin layer material pouring runner $8a_1$ is poured into runners $8a_2, 8a_3$ and $8a_4$ from the center points thereof, and as regards the amounts of skin layer resin material which enter the respective runners, the skin layer resin material begins to fill the runners $8a_2$ and $8a_4$ nearest to the runner $8a_1$ and the amount of skin layer resin material filling the runner $8a_3$ most distant from the runner $8a_1$ is small.

If the amounts of skin layer resin material which enter the respective runners differ from one another as shown in FIG. 5, non-uniformity will occur to the sandwich thickness of the skin layer and core layer depending on the position of the cylinder portion of the barrel member, and this will adversely affect the strength and the lubricity of the surface.

SUMMARY OF THE INVENTION

The present invention proposes improvements in a metal mold structure which solve the above-described three problems in sandwich molding, and in order to solve the aforementioned first problem, it proposes to provide a resin reservoir portion at the junction of a runner for the skin and a sprue for the core in a direction perpendicular to the axial direction of the sprue for the core (the axial direction of the flow direction in which the core layer resin flows through the sprue for core) so as to prevent at said junction the non-uniform filling caused by eccentricity of the core layer resin resulting from the core layer resin entering the runner for the skin and to permit the entire inner periphery of the cavity to accomplish uniform sandwich molding.

In order to solve the mixing of a core layer resin material and a skin layer resin material which is the aforementioned second problem, the present invention proposes to attach, to a mold member provided with a cavity for molding a cylindrically-shaped part, a runner plate provided with a plurality of runners for passing the resin materials therethrough into said cavity, to attach to said runner plate a fixed plate provided with a sprue connected to an injection cylinder unit for the core layer resin and an injection cylinder unit for the skin layer resin, to arrange the start point of said plurality of runners and the injection port of said injection cylinder unit for the core layer resin on a straight line, to provide a runner for the skin layer resin between the injection cylinder unit for the skin layer resin and the start point of said runners, and to provide a gate of reduced resin flow cross-section in said runner for the skin layer resin in said metal mold.

The present invention provides a metal mold which eliminates the non-uniformity of the amounts of the skin layer resin entering the respective runners which is the aforementioned third problem and can form uniform sandwich layers.

BRIEF DESCRIPTION OF THE DRAWINGS

FIGS. 7 to 12 show a second embodiment which solves the aforementioned second problem, FIG. 7 being a cross-sectional view of the essential portions of a molding apparatus, FIG. 8A being a perspective view of a sprue and a runner portion, FIG. 8B being a cross-sectional view of the sprue and the runner portion, FIG. 9 being a plan view of the sprue and the runner portion, FIGS. 10A and 10B showing the state of flow of resin in the sprue and the runner portion, FIG. 11 being a perspective view of the sprue and the runner portion in a case where there are six second runners, and FIG. 12 being a perspective view of the sprue and the runner portion in a case where there is no second runner.

FIGS. 13 to 17B show a third embodiment which solves the aforementioned third problem, FIG. 13 being an illustration of a molding machine according to this embodiment, FIG. 14A and 14B being a perspective view and a fragmentary cross-sectional view, respectively, showing the sprues of a runner plate and a fixed plate and runners, FIGS. 15 and 16 showing the state in which the skin layer resin is poured into the runners, and FIGS. 17A and 17B being illustrations of a gate G.

DESCRIPTION OF THE PREFERRED EMBODIMENTS

Figure 2B:
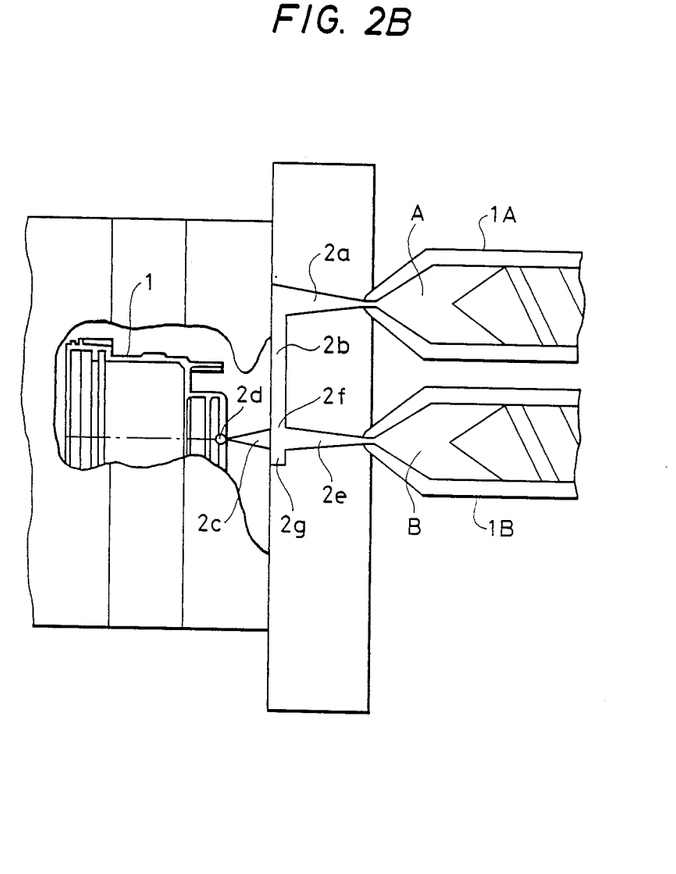
FIG. 2B illustrates an embodiment of a molding machine of the present invention.
Figure 6A:
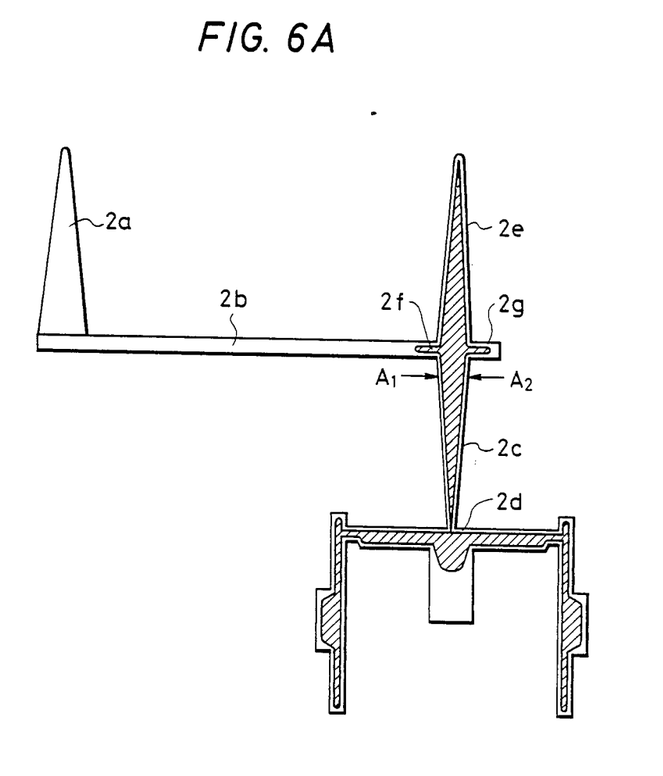
FIGS. 6A and 6B show a first embodiment which solves the aforementioned first problem, FIG. 6A showing the state of resin in each runner portion and a cavity, and FIG. 6B being a cross-sectional view taken along line A1–A2 of FIG. 6A.
Figure 6B:
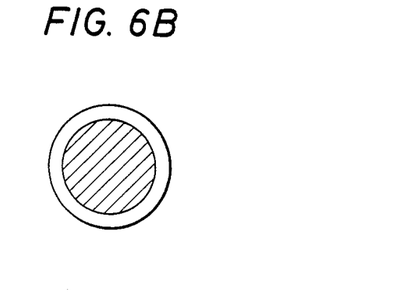

Reference is now had to FIGS. 2B, 6A and 6B to describe in detail an embodiment of the present invention which solves the eccentricity of the injected amount of the core layer resin material which is the aforementioned first problem. In these figures, reference characters similar to those in FIG. 1 designate functionally similar parts and members.

In FIGS. 2B and 6A, a resin stagnating portion $2g$ is provided at the junction $2f$ of a runner $2b$ for the skin and a sprue $2e$ for the core in a direction perpendicular to the direction of the flow axis along which the core layer resin B flows.

Alternatively, the resin stagnating portion $2g$ may be provided all around the axis, or may be provided at a location opposed to the runner $2b$ for skin.

In the molding machine of FIG. 2B, when a skin layer resin material is injected from a first injection cylinder, not shown, the injected resin passes through a gate $2d$ via a sprue $2a$ for the skin, the runner $2b$ for the skin and a common runner $2c$ and is injected into a cavity. After the injection of the skin layer resin has been completed, a core layer resin material is injected from a second injection cylinder, not shown, and the core layer resin passes through a sprue for the core to the aforesaid junction $2f$, and when the core layer resin having arrived at the junction $2f$ passes the junction $2f$, part of the core layer resin B enters from the junction $2f$ into the resin stagnating portion $2g$. By the core layer resin B entering into the resin stagnating portion $2g$, the flow axis of the core layer resin B flowing toward the runner $2c$ does not become eccentric from the center of the cross-section of the runner and thus, as shown in FIGS. 6A and 6B, the core layer resin is uniformly injected into the cavity.

Thus, according to the present invention, any portion which fails to be sandwich-molded during sandwich molding can be eliminated and a cylindrical molding member can accomplish generally uniform sandwich molding and therefore, a molded article of uniform strength can be obtained. Particularly, there can be provided a molding machine suitable for a molded article which requires uniform strength of the entire part such as the lens barrel of the optical part as mentioned in the present embodiment.

FIGS. 7 to 12 show a metal mold structure which eliminates the mixing of the skin layer resin material and the core layer resin material which is the aforementioned second problem.

Figure 7:
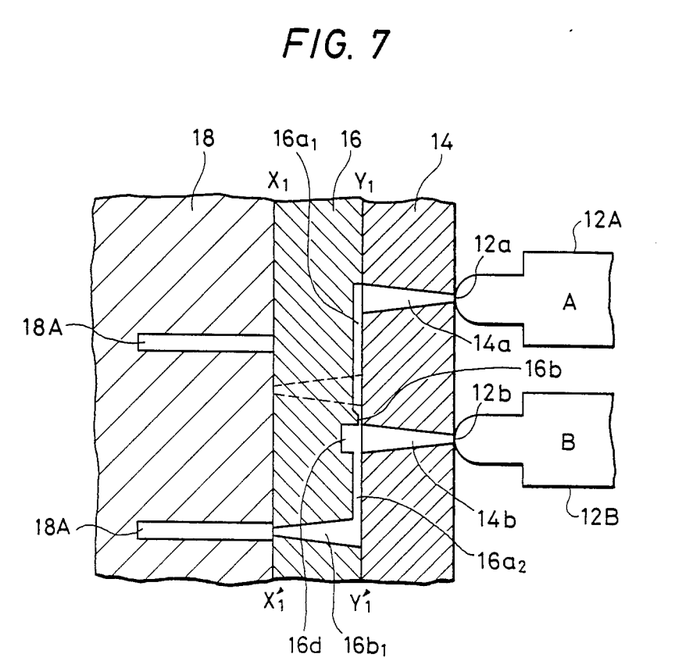

Referring to FIG. 7 which is a cross-sectional view showing the essential portions of an apparatus according to a second embodiment of the present invention, reference characters 12A and 12B designate first and second injection cylinder units, respectively. A resin material A for forming a skin layer is injected from the injection port $12a$ of the first injection cylinder unit, and a resin material B for forming a core layer is injected from the injection port $12b$ of the second injection cylinder unit.

Reference numeral 18 denotes a mold member provided with a cavity 18A for molding a hollow cylindrical member such as the cylinder member of a lens barrel.

Reference numeral 14 designates a fixed plate provided with a first sprue $14a$ for the skin layer resin and a second sprue $14b$ for the core layer resin which are connected to the injection ports $12a$ and $12b$ of the first and second injection cylinder units.

Reference numeral 16 denotes a runner plate located between the mold member 18 and the fixed plate 14. Line $X_1$-$X'_1$ indicates the joined surface of the mold member and the runner plate 16, and the joined surface $X_1$-$X'_1$ is provided in a direction perpendicular with the axial direction of the hollow cylindrical molding body of the mold member 18.

Line $Y_1$-$Y'_1$ indicates the joined surface of the runner plate 16 and the fixed plate 14. The runner plate 16 is provided with a first runner $16a_1$, connecting the first sprue $14a$ and the second sprue $14b$, a first gate $16b$ of an area smaller than the cross-sectional area of the runner for the skin layer resin, a resin reservoir $16d$ provided on the runner plate in line with the sprue $14b$ for the core layer resin, a second runner $16a_2$, communicating with the resin reservoir $16d$ and uniformly radially extending on the same plane as plane $Y_1$-$Y'_1$, a second runner, and a third runner $16b_2$ communicating with a cavity 18A provided in a template 18.

Figures 8A, 8B:
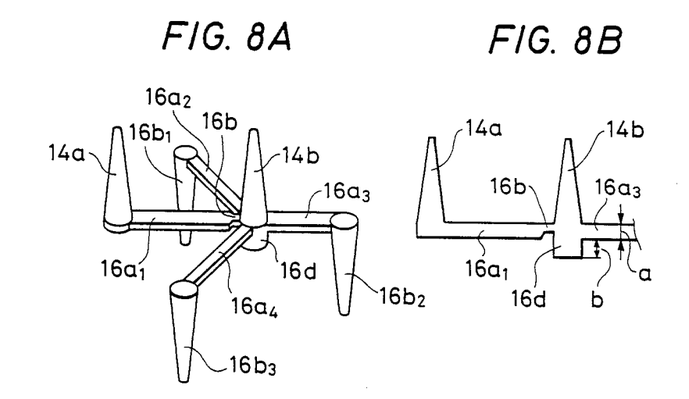

FIG. 8A is a perspective view showing the fixed plate of the molding apparatus shown in FIG. 7, the first sprue $14a$ and the second sprue $14b$ in the runner plate, the first runner $16a_1$, the second runner $16a_2$, the third runner $16b_1$, the first gate $16b$ and the resin reservoir $16d$.

In FIG. 8B, letter a indicates the thickness of the second runner $16a_2$, and letter b indicates the thickness of the resin reservoir $16d$.

Figure 9:
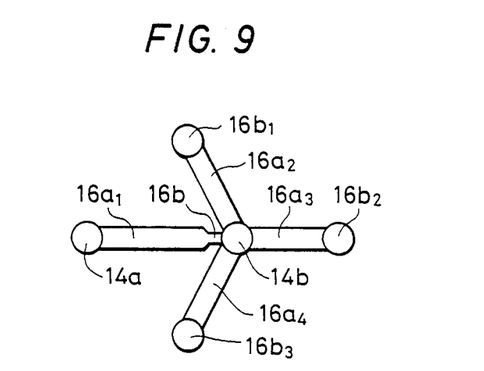

FIG. 9 is a plan view of the sprues and runners on the plane $Y_1$-$Y'_1$ of FIG. 7.

Figure 10A:
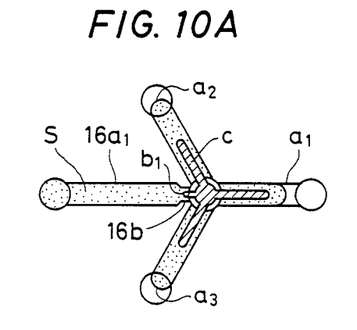
Figure 10B:
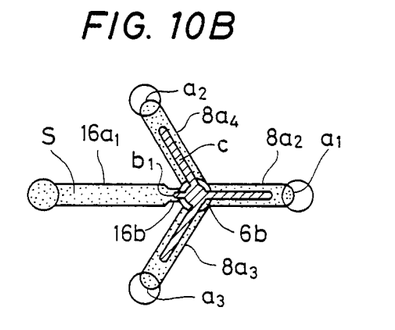

FIGS. 10A and 10B show the states of flow of first and second resins when the present invention is used and when the present invention is not used.

FIG. 10A shows the state of flow of resin when the first gate $16b$ according to the present invention is provided, and the back flow of the second resin c to the first runner $16a_1$ is stopped at $b_1$ in the first gate $16b$.

In FIG. 10B, by the first gate $16b$ being provided, the back flow of the second resin c toward the first runner $16a_1$ is stopped at $b_1$ in the first gate, and by the resin reservoir $16d$ being provided, the resin is uniformly distributed to the second runners $8a_2$ ($a_1, \ldots, a_3$).

The cross-sectional area of the gate $16b$ should preferably be such that when the skin layer resin is first poured in and the skin layer runner $16a_1$ is filled with the skin layer resin and then the core layer resin is poured in, the central temperature of the skin layer resin in the gate $16b$ becomes lower than the transition point temperature of the skin layer resin and the skin layer resin in the gate $16b$ is subjected to the heat radiation or cooling by the wall surrounding the gate $16b$ to thereby harm the fluidity of the skin layer resin and the core layer resin is prevented from passing through the gate 16*b* into the skin layer runner 16*a*₁.

For this purpose, the diameter of the gate 16*b* may be set to 1–4 mm, whereas the diameter of the runner 16*a*₁, may be set to 3–8 mm and the cross-sectional area ratio may be set to the range of $S16b/S16a = 0.015-0.5$.

Figure 11:
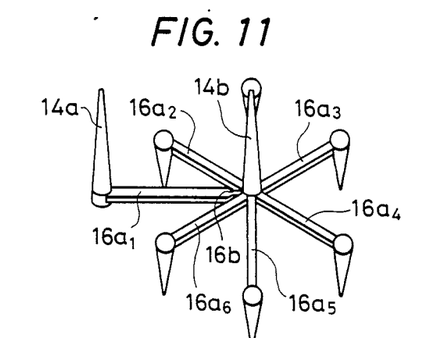

FIG. 11 shows a case where there are six second runners (16*a*₁, . . . , 16*a*₆).

Figure 12:
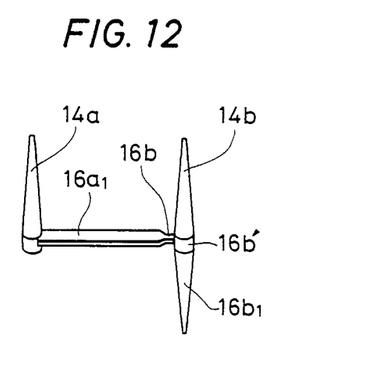

FIG. 12 shows a case where there is no second runner but there is a third runner 16*b*₁. Again in the cases shown in FIGS. 11 and 12, a gate 16*b* for reducing the cross-sectional area of the runner and preventing the inflow of the core layer resin B is provided at the fore end of the runner 16*a*₁ which is adjacent to the junction between the runner 16*a*₁ for the skin layer resin and the runner 14*b* for the core layer resin.

As described above, the first gate is provided at the junction of the first runner and the second sprue, whereby when the second resin is poured in from the second sprue after the first resin has been injected, the back flow of the second resin toward the first runner stops in the first gate and therefore, the mixing of the first resin and the second resin by the back flow and the resin pressure loss during the injection of the second resin are eliminated and the second resin is uniformly distributed and poured into the second runners, and also the resin pressure which excessively affects the accuracy of the molded article is uniformly applied. Also, by the prescribed amount of resin reservoir being provided, the non-uniform filling of the second runners with the first resin by the inertial flow thereof and the non-uniform filling of the second runners with the first resin during the steady flow thereof is eliminated and uniform distribution of the first resin into the second runners is achieved.

The resin reservoir portion mentioned herein structurally and functionally differs from the conventionally used resin reservoir portion for sprue locking or for runner locking. That is, the conventionally used resin reservoir portion is for locking the sprue or the runner and is inversely tapered or Z-shaped and must be small in surface area and large in cross-sectional area so that it may be cooled more quickly than the sprue or the runner. The resin reservoir of the present invention must not be cooled more quickly than the sprue or the runner and for this reason, it is small in surface area and is not inversely tapered or Z-shaped but is in the form of a tapered or straight cylinder. Accordingly, it differs from the conventional cold slug reservoir or the conventional resin reservoir portion for locking.

Thus, due to the above-described effect, there is provided a multi-layer molded article of high accuracy which is uniformly filled with the first and second resins.

FIGS. 13 to 17B show an example of the metal mold structure which eliminates the non-uniformity of the core layer resin material which is the third problem.

Figure 13:
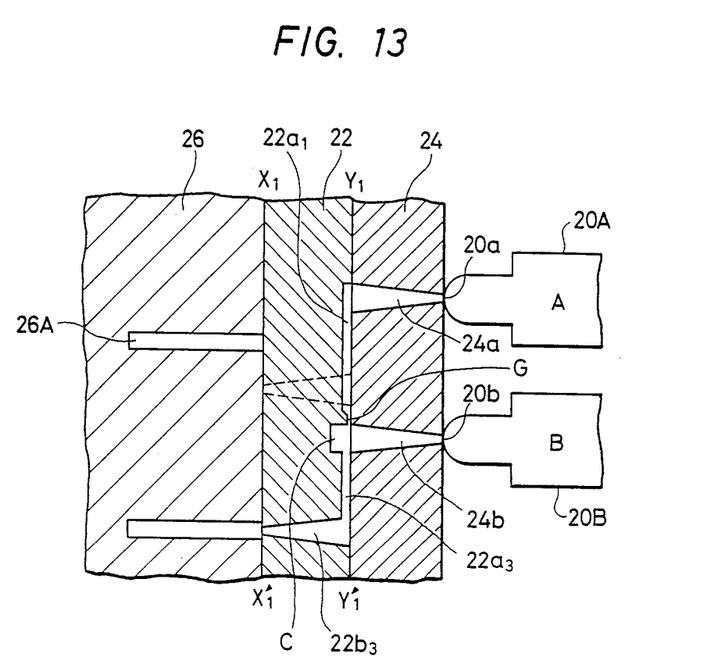
Figure 14A:
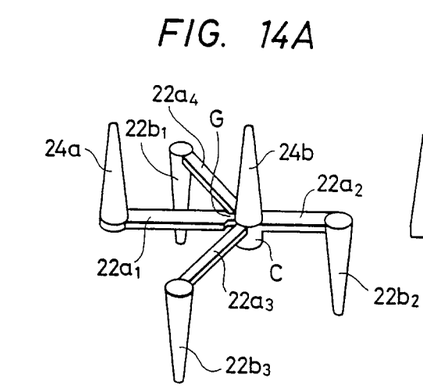
Figure 14B:
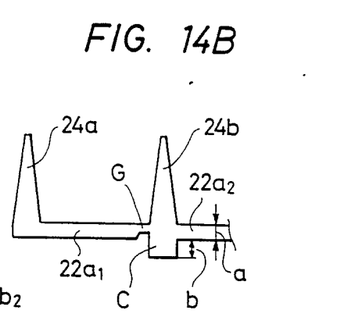

The structural feature of the metal mold shown in FIG. 13 resides in a runner plate 22. The skin layer resin pouring sprue 24*a* of the fixed plate 24 is connected to the runner plate 22. The fore end portion of a runner 22*a*₁ for the skin layer resin lies at the point of intersection whereat the runner 22*a*₁ is orthogonal to the fore end of a sprue 24*b* for pouring the core layer resin, and runners 22*a*₂, 22*a*₃ and 22*a*₄ connecting runners 22*b*₁, 22*b*₂ and 22*b*₃ extending in a direction parallel with a cavity forming a pin gate extend from said point of intersection, and a gate portion G reduced in cross-sectional area is provided near the outlet portion of the runner 22*a*₁ for the skin layer resin, and a resin reservoir portion C for storing the resin is provided on the extension of the sprue 24*b* for pouring the core layer resin.

When the skin layer resin A is injected from the skin layer resin injection cylinder unit 20A into the sprue 24*a* and runner 22*a*₁ the skin layer resin A leaves the gate G and is first poured into the resin reservoir portion C. When the resin reservoir portion C is filled with the skin layer resin, the skin layer resin subsequently injected through the runner 22*a*₁ presses the skin layer resin in the resin reservoir portion C, and uniform pressure acts on the pressed resin in the resin reservoir portion in all the directions in which the resin can advance and thus, substantially equal amounts of skin layer resin are poured into the runners 22*a*₂, 22*a*₃ and 22*a*₄.

When the core layer resin B is injected from the cylinder unit 20B into the sprue 24*b* after a predetermined amount of skin layer resin A has been poured in, the core layer resin B collects in the resin reservoir portion and presses the central portions of the skin layer resin in the runners 22*a*₂, 22*a*₃ and 22*a*₄ and thus, the skin layer resin is pushed forward by the core layer resin and the cavity is filled with the skin layer resin and the core layer resin while the skin layer resin is pushed against the peripheral wall of the cavity.

Figure 15:
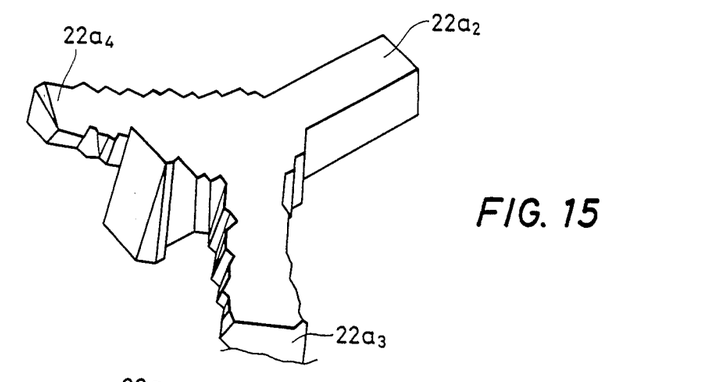

FIG. 15 shows the state of inflow of the skin layer resin in each runner. As will be appreciated from comparison with the state of the inflow shown in FIG. 5, the thickness of the skin layer resin in each of the runners 22*a*₂, 22*a*₃ and 22*a*₄ is uniform, and it is seen that a sufficient amount of the skin layer resin is poured particularly into the runner 22*a*₃ which is most distant from the runner 22*a*₁ for pouring the skin layer resin.

The state of the skin layer resin poured into each runner as shown in FIG. 15 refers to the state of the resin when the thickness a and depth b of the runners 22*a*₂, 22*a*₃ and 22*a*₄ are in the relation that $2a < b < 10a$.

Figure 16:
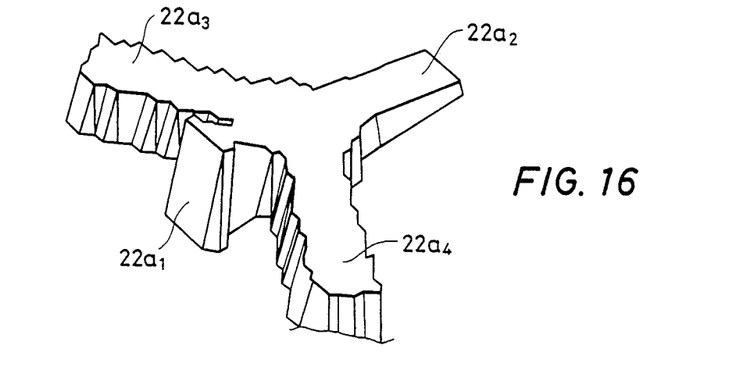

Incidentally, FIG. 16 shows the state of the resin when said thickness and depth are set to the relation that $b < 2a$, and as seen in this figure, substantially preferable amounts of the skin layer resin poured into the runners 22*a*₃ and 22*a*₄ can be secured, the amount of skin layer resin poured into the runner 22*a*₂ is quite insufficient.

The gate G serves to prevent the core layer resin from entering the runner 22*a*, for the skin layer resin to thereby mix with the skin layer resin.

Figure 17A:
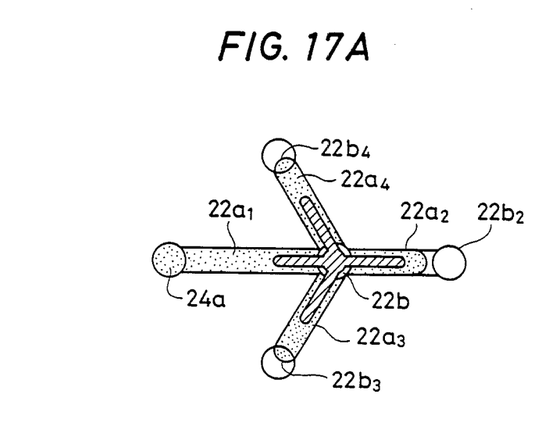

That is, in the case of a mold in which, as shown in FIG. 17A, the runner 22*a*₁ for the skin layer resin is not provided with a gate reduced in cross-sectional area, when the core layer resin is poured from the sprue 24*b* for pouring the core layer resin into the runners 22*a*₂, 22*a*₃ and 22*a*₄ after the skin layer resin has been poured in, the core layer resin also enters the runner 22*a*₁ for the skin layer resin. Therefore, during the next molding operation, the skin layer resin in the runner 22*a*₁ for the skin layer resin will mix with the core layer resin to prevent the desired sandwich molding from being accomplished.

Figure 17B:
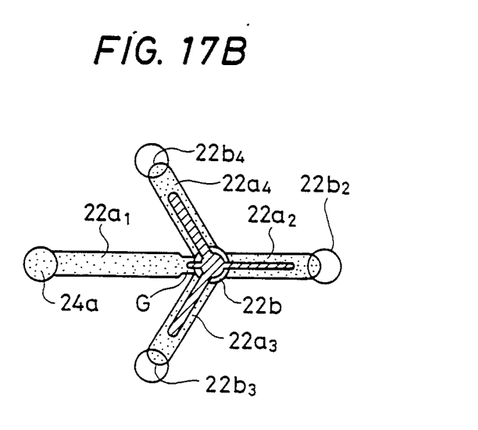

In contrast, if as shown in FIG. 17B, a gate G reduced in runner cross-sectional area is provided near the outlet of the runner for the skin layer resin, the core layer resin will be prevented from entering the runner 22*a*₁ by the gate G and therefore, in the runner 22*a*₁, the mixing of the skin layer resin and the core layer resin can be prevented.

Further, the gate G serves to uniformly pour the core layer resin into each runner. That is, when the core layer resin is poured in after the skin layer resin has been poured in, the core layer resin poured in from the sprue 24b for pouring the core layer resin pushes forward the skin layer resin collected in the resin reservoir portion C and at the same time, it imparts a uniform core layer resin pressing (pouring) force to the runners $22a_2$, $22a_3$ and $22a_4$ which do not have the gate G with the aid of the gate G, and equal amounts of the core layer resin are poured into the skin layer resin in the runners $22a_2$, $22a_3$ and $22a_4$ and thus, uniform sandwich molding becomes possible over the whole of the cylinder member to be molded.

According to the present embodiment, when effecting sandwich molding, the thickness of the sandwich construction of the skin layer resin and the core layer resin can be made uniform over the entire periphery of the cylinder and thus, there can be obtained a cylinder in which the slidability of the surface is uniform over its entire periphery. Also there is no irregularity in the thicknesses of the skin layer and the core layer and thus, there can be obtained a cylinder member which is also excellent in strength.

What is claimed is:

1. A metal mold for a multi-layer resin molded article for effecting, in injection-molding a cylindrically-shaped part, sandwich molding in which core layer resin is used for the center of the cylinder portion of the cylindrically-shaped part and skin layer resin is used for the portion around said center of the cylinder portion, characterized in that a mold member provided with a cavity for molding said cylindrically-shaped part has attached thereto a runner plate provided with a plurality of runners for passing said resins therethrough into said cavity, said runner plate has attached thereto a fixed plate provided with a sprue connected to an injection cylinder unit for the core layer resin and an injection cylinder unit for the skin layer resin, the start point of said plurality of runners and the injection port of said injection cylinder unit for the core layer resin are arranged on a straight line, a resin reservoir is provided at a position on said straight line, a runner for the skin layer resin is provided between said injection cylinder unit for the skin layer resin and said start point of said runners, and a gate having a reduced resin flow-cross-section is provided at a location in said runner for the skin layer resin near said resin reservoir.

2. An injection molding machine for a cylindrical molded article with a center of core layer resin and a skin layer resin, comprising:
    a mold having a cavity for molding said cylindrical article;
    an injection cylinder unit for the skin layer resin;
    an injection cylinder unit for the core layer resin;
    a runner plate provided with a common runner for the skin layer resin and the core layer resin, said skin layer resin and core layer resin being injected through said common runner into said cavity;
    a plate member connected to said injection cylinder unit for said skin layer resin and said injection cylinder unit for said core layer resin, said plate member having a sprue for the skin layer resin and a sprue for said core layer resin;
    a runner for said skin layer resin, said runner being provided between said sprue for the skin layer resin and a start point of said common runner; and
    a resin reservoir forming a resin inflow portion facing said runner for the skin layer resin at a junction of said runner for the skin layer resin, the common runner and the sprue for the core layer resin, the core layer resin flowing into said resin reservoir upon injection of the core layer resin, said resin reservoir preventing deviation of a center of injection of the core layer resin.

* * * * *

UNITED STATES PATENT AND TRADEMARK OFFICE
CERTIFICATE OF CORRECTION

PATENT NO. : 4,840,553

DATED : June 20, 1989

INVENTOR(S) : Aria

It is certified that error appears in the above-identified patent and that said Letters Patent is hereby corrected as shown below:

COLUMN 1:

Line 41, "material" should read --materials--.

COLUMN 2:

Line 42, "for core," should read --for the core,--; and

Line 48, "for core," should read --for the core,--.

COLUMN 3:

Line 39, "resin" should read --resins--.

COLUMN 4:

Line 7, "for core)." should read --for the core)--.

COLUMN 5:

Line 32, "for skin." should read --for the skin.--.

UNITED STATES PATENT AND TRADEMARK OFFICE
CERTIFICATE OF CORRECTION

PATENT NO. : 4,840,553

DATED : June 20, 1989

INVENTOR(S) : Aria

It is certified that error appears in the above-identified patent and that said Letters Patent is hereby corrected as shown below:

COLUMN 8:

Line 7, "$22a_1$" should read --$22a_1$,--;

Line 31, "is uniform," should read --is made uniform,--; and

Line 47, "skin" should read --core--.

Signed and Sealed this

Seventh Day of August, 1990

Attest:

HARRY F. MANBECK, JR.

*Attesting Officer*     *Commissioner of Patents and Trademarks*